US007006557B2

(12) United States Patent
Subrahmanya et al.

(10) Patent No.: US 7,006,557 B2
(45) Date of Patent: Feb. 28, 2006

(54) TIME TRACKING LOOP FOR DIVERSITY PILOTS

(75) Inventors: Parvathanathan Subrahmanya, Sunnyvale, CA (US); Kevin J. Clark, Alamo, CA (US)

(73) Assignee: Qualcomm Incorporated, San Diego, CA (US)

( * ) Notice: Subject to any disclaimer, the term of this patent is extended or adjusted under 35 U.S.C. 154(b) by 746 days.

(21) Appl. No.: 10/061,873

(22) Filed: Jan. 31, 2002

(65) Prior Publication Data

US 2003/0142729 A1 Jul. 31, 2003

(51) Int. Cl.
*H04B 1/69* (2006.01)
(52) U.S. Cl. .................. 375/147; 375/136; 375/148; 375/149; 375/152; 375/219; 375/316; 375/326; 375/267
(58) Field of Classification Search ................ 375/147, 375/148, 149, 150, 141, 142, 136, 152, 219, 375/267, 316, 326; 455/137; 370/335, 208
See application file for complete search history.

(56) References Cited

U.S. PATENT DOCUMENTS

| | | | | |
|---|---|---|---|---|
| 5,852,630 A | * | 12/1998 | Langberg et al. | ........... 375/219 |
| 5,912,919 A | | 6/1999 | Lomp et al. | |
| 6,456,648 B1 | * | 9/2002 | Bultan et al. | ................ 375/148 |
| 6,483,867 B1 | * | 11/2002 | Mannermaa | ................. 375/149 |
| 6,667,962 B1 | * | 12/2003 | Lee et al. | .................... 370/335 |
| 6,765,952 B1 | * | 7/2004 | Shiu | ........................... 375/147 |
| 2001/0031647 A1 | | 10/2001 | Scherzer et al. | |
| 2002/0126746 A1 | * | 9/2002 | Rick et al. | ................... 375/148 |

* cited by examiner

*Primary Examiner*—Stephen Chin
*Assistant Examiner*—Ted Wang
(74) *Attorney, Agent, or Firm*—Philip R. Wadsworth; Charles D. Brown; George C. Pappas (57) ABSTRACT

Techniques for time tracking diversity pilots are disclosed. In one aspect, an early and a late energy calculation is made on each incoming symbol using a first pilot sequence for despreading. The difference between the two energies is used to drive a tracking loop, which generates a time reference for producing a first pilot estimate and a second pilot estimate, the two estimates used for demodulating data. In another aspect, the early and late energies are made including a plurality of incoming symbols, the number of which corresponds to the number of symbols in a run of positive or negative values in an orthogonalizing sequence. The orthogonalizing sequence is used to generate a second pilot sequence from a first pilot sequence, the resulting second pilot sequence being orthogonal to the first. These aspects have the benefit of simplifying the hardware or processing steps required for transmit diversity time tracking, resulting in cost savings, power savings, simplicity of design, and the like.

15 Claims, 7 Drawing Sheets

| Primary | A | A | A | A | A | A | A | A | ... |
|---|---|---|---|---|---|---|---|---|---|
| Diversity | A | -A | -A | A | A | -A | -A | A | ... |
| Symbol Number | 0 | 1 | 2 | 3 | 4 | 5 | 6 | 7 | ... |

TIME TRACKING LOOP FOR DIVERSITY PILOTS

FIELD

The present invention relates generally to communications, and more specifically to a novel and improved method and apparatus for time tracking diversity pilots.

BACKGROUND

Wireless communication systems are widely deployed to provide various types of communication such as voice and data. These systems may be based on code division multiple access (CDMA), time division multiple access (TDMA), or some other modulation techniques. A CDMA system provides certain advantages over other types of systems, including increased system capacity.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in a set of documents including "C.S0002-A Physical Layer Standard for cdma2000 Spread Spectrum Systems," the "C.S0005-A Upper Layer (Layer 3) Signaling Standard for cdma2000 Spread Spectrum Systems," and the "C.S0024 cdma2000 High Rate Packet Data Air Interface Specification" (the cdma2000 standard), and (4) some other standards.

One technique used to enhance performance, including system capacity and data throughput, is to lower the required transmit signal power by employing transmit diversity. Transmit diversity involves transmitting data on two or more antennas, where the geographical separation between the antennas leads to path loss characteristics that are independent from antenna to antenna. Thus, a receiving station can coherently combine signals from the transmit diversity antennas, and the noise introduced in the channel will not combine coherently, thus increasing the signal-to-noise ratio (SNR) received.

To maximize received energy and minimize errors, time tracking is performed to minimize phase differences between the pilot signals used for demodulation and the signals being demodulated. Techniques for time tracking in a transmit diversity system include methods for tracking signals from the plurality of antennas independently, as well as methods for tracking a weighted average of the signals from the various antennas with a single tracking loop. These methods are described in co-pending U.S. patent application Ser. No. 09/964,589, entitled "TIME TRACKING IN A NON-NEGLIGIBLE MULTIPATH SPACING ENVIRONMENT", filed Sep. 25, 2001, and assigned to the assignee of the present invention.

Time tracking can be performed in discrete special purpose hardware, in a digital signal processor (DSP), or other general-purpose processor, or a combination of the two. Complexity in hardware introduces increased costs, often in terms of circuit area and power consumption. Additional complexity in software takes up processing time, perhaps leading to increased power consumption, or the requirement of more powerful and costly processors, or both. Simplified time tracking procedures that perform comparably with more complex procedures are clearly desirable. There is therefore a need in the art for an improved time tracking loop for diversity pilots.

SUMMARY

Embodiments disclosed herein address the need for an improved time tracking loop for diversity pilots. In one aspect, an early and a late energy calculation is made on each incoming symbol using a first pilot sequence for despreading. The difference between the two energies is used to drive a tracking loop, which generates a time reference for producing a first pilot estimate and a second pilot estimate, the two estimates used for demodulating data. In another aspect, the early and late energies are made including a plurality of incoming symbols, the number of which corresponds to the number of symbols in a run of positive or negative values in an orthogonalizing sequence. The orthogonalizing sequence is used to generate a second pilot sequence from a first pilot sequence, the resulting second pilot sequence being orthogonal to the first. These aspects have the benefit of simplifying the hardware or processing steps required for transmit diversity time tracking, in some embodiments with equal performance to more complex procedures, resulting in cost savings, power savings, simplicity of design, and the like.

The invention provides methods and system elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
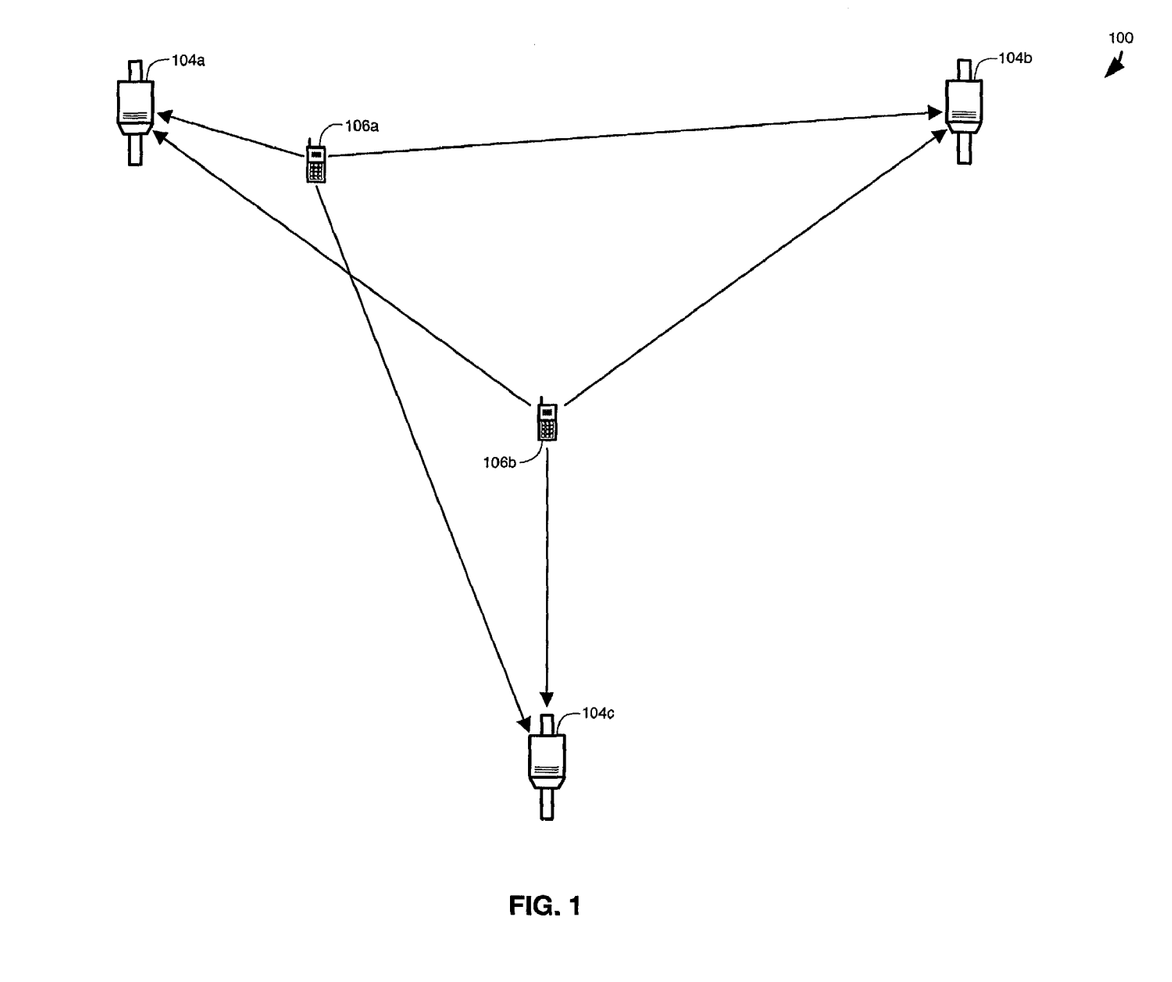
FIG. 1 is a general block diagram of a wireless communication system capable of supporting a number of users.

FIG. 1 is a diagram of a wireless communication system 100 that may be designed to support one or more CDMA standards and/or designs (e.g., the W-CDMA standard, the IS-95 standard, the cdma2000 standard, the HDR specification). For simplicity, system 100 is shown to include three base stations 104 in communication with two mobile stations 106. The base station and its coverage area are often collectively referred to as a "cell". In IS-95 systems, a cell may include one or more sectors. In the W-CDMA specification, each sector of a base station and the sector's coverage area is referred to as a cell. As used herein, the term base station can be used interchangeably with the terms access point or NodeB. The term mobile station can be used interchangeably with the terms user equipment (UE), subscriber unit, subscriber station, access terminal, remote terminal, or other corresponding terms known in the art. The term mobile station encompasses fixed wireless applications.

Depending on the CDMA system being implemented, each mobile station 106 may communicate with one (or possibly more) base stations 104 on the forward link at any given moment, and may communicate with one or more base stations on the reverse link depending on whether or not the mobile station is in soft handoff. The forward link (i.e., downlink) refers to transmission from the base station to the mobile station, and the reverse link (i.e., uplink) refers to transmission from the mobile station to the base station.

For clarity, the examples used in describing this invention may assume base stations as the originator of signals and mobile stations as receivers and acquirers of those signals, i.e. signals on the forward link. Those skilled in the art will understand that mobile stations as well as base stations can be equipped to transmit data as described herein and the aspects of the present invention apply in those situations as well. The word "exemplary" is used exclusively herein to mean "serving as an example, instance, or illustration." Any embodiment described herein as "exemplary" is not necessarily to be construed as preferred or advantageous over other embodiments.

Figure 2:
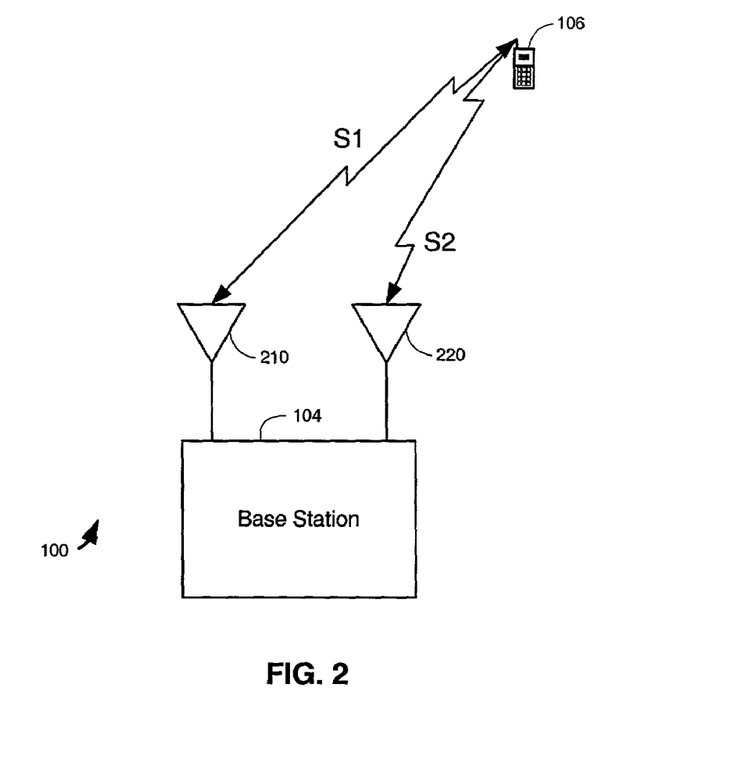
FIG. 2 depicts a portion of a wireless communication system with a base station and mobile station equipped for transmit diversity.

FIG. 2 shows an embodiment of system 100, detailing a transmit diversity scheme. Base station 104 is equipped with two antennas, 210 and 220, for communicating with mobile station 106. (Alternative embodiments may use more than two antennas.) The links between antennas 210 and 220 and mobile station 106 are labeled S1 and S2, respectively. The two antennas are located with enough geographical separation that the fading experienced on S1 is independent from the fading on S2, yet the two signals arrive at mobile station 106 at essentially the same time. Various techniques can be employed such that the two signals can be combined constructively at the mobile station, and in so doing combat some of the deleterious effects that would be introduced if only a single antenna were deployed.

One such scheme, detailed in the above referenced W-CDMA standard, is closed-loop transmit diversity. The phase of a signal, S2, transmitted on diversity antenna 220 is adjusted in relation to the signal, S1, transmitted on primary antenna 210 so that the two signals, S1 and S2, are in-phase and maximally combined when received at mobile station 106. The terms primary and diversity, applied to antennas 210 and 220, respectively, are used only to distinguish the two antennas. Those of skill in the art will recognize that phase adjustment can take place on either antenna (or on multiple antennas).

In an alternate scheme, such as space time transmit diversity (STTD), different data is transmitted on each antenna. The data is transmitted in such a fashion that it can be recombined when received at the mobile station. For example, consider a two-antenna transmit diversity scheme, where the symbols transmitted on the primary antenna (or antenna 1) are received at the mobile with complex gain, g0, and the symbols transmitted on the diversity antenna (or antenna 2) are received with complex gain g1. The complex gains are functions of the channels through which the two signals propagate.

Consider two adjacent complex data symbols awaiting transmission, d1 and d2. The data to be transmitted is distributed across the two antennas as follows: during one symbol transmission period, d1 is transmitted on antenna 1, and −d2* (where * represents the conjugate) is transmitted on antenna 2. In the next symbol transmission period, d2 is transmitted on antenna 1 and d1* is transmitted on antenna 2. The signal received at the mobile station during the first symbol transmission period is r1, where r1=g0d1−g1d2*. The signal received at the mobile station during the second symbol transmission period is r2, where r2=g0d2+g1d1*. If the channel gains, g0 and g1, are known, then the two equations r1 and r2 are sufficient to recover the data, d1 and d2.

Figure 3:
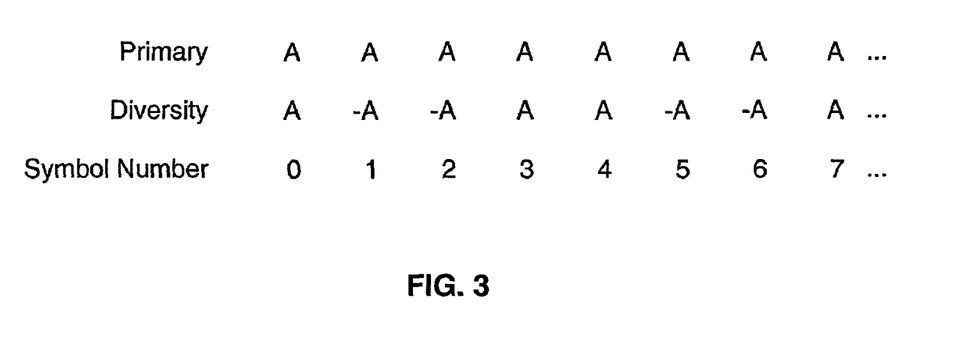
FIG. 3 shows the relationship between two pilot signals for diversity transmission, as defined by the W-CDMA standard.

Pilot signals received at the mobile station are proportional to the channel gains, g0 and g1. The channel gains can be estimated by recovering the two pilot signals, pilot 1 and pilot 2, transmitted on the primary and diversity antennas, respectively. The recovered pilots can be used to demodulate signals transmitted from the respective antennas, described in further detail below. In the exemplary embodiment, pilot signals transmitted on each of the plurality of diversity antennas are orthogonal to one another. This property facilitates recovery of the pilots once they are received at the mobile station and minimizes interference. One technique for generating orthogonal pilots in a CDMA system is to multiply a first pseudorandom noise (PN) sequence, used for a first pilot signal, by an orthogonalizing signal to produce a second pilot signal. FIG. 3 depicts how an exemplary set of pilot signals can be generated, as described in the W-CDMA standard. In FIG. 3, multiplying a base PN sequence by the value shown corresponding to the symbol number creates the primary and diversity pilots. In this example, the primary pilot is generated by multiplying a base PN sequence by a constant amplitude, A. Multiplying the base PN sequence by A in symbols 0 and 3 generates the diversity pilot, and by −A in symbols 1 and 2. The pattern is repeated for each subsequent set of four symbols. In the exemplary embodiment, each symbol comprises 256 chips. It is readily seen that the resultant primary and diversity pilot sequences are orthogonal to one another. Those of skill in the art will recognize various other orthogonalizing sequences that can be applied to generate orthogonal pilot sequences using a common underlying sequence. Those of skill will further recognize that additional orthogonalizing sequences can be constructed to generate a plurality of orthogonal pilots for transmitting on a plurality of diversity antennas.

Figure 4:
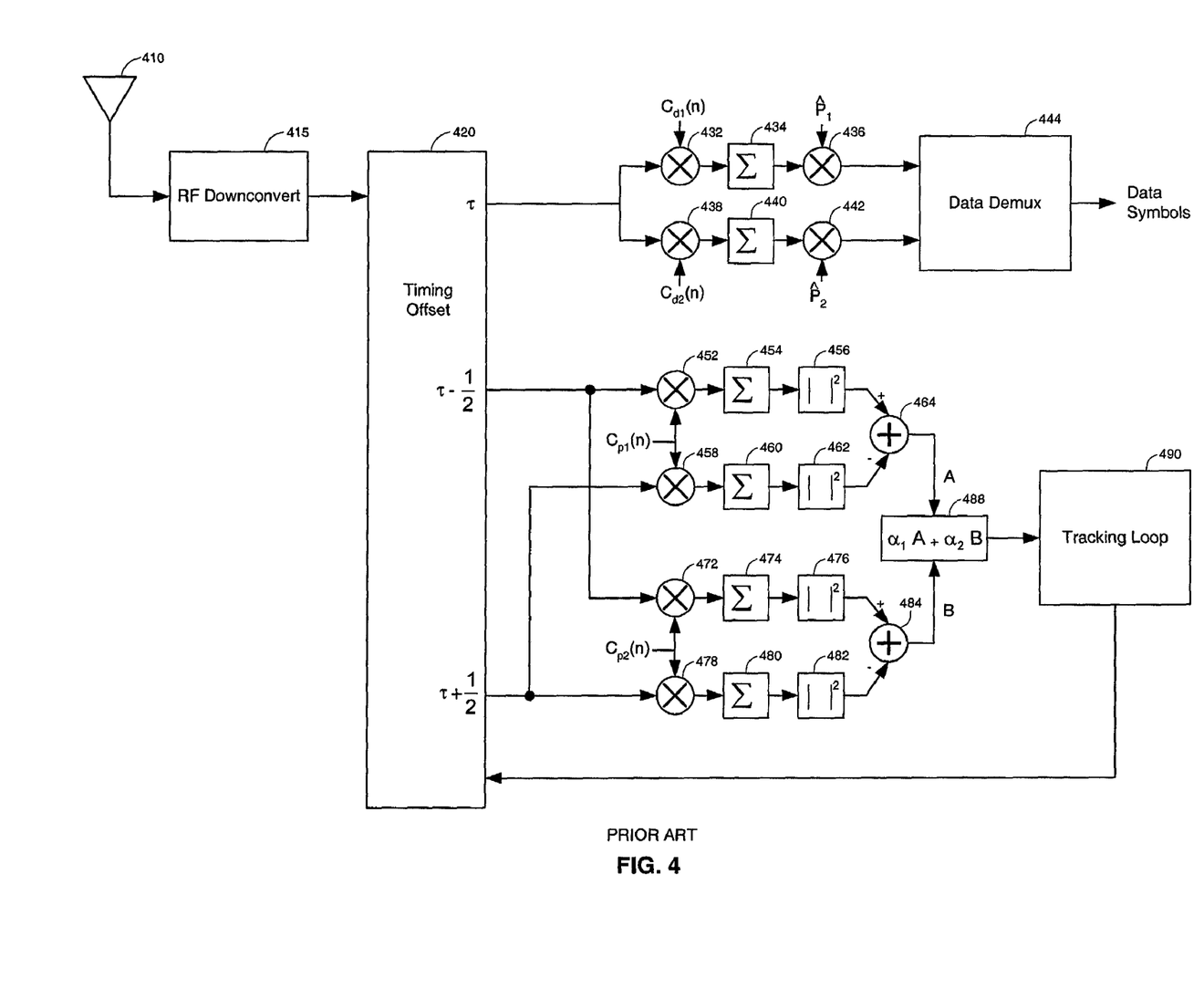
FIG. 4 depicts a prior art implementation of a transmit diversity tracking loop for tracking the average of two diversity-transmitted pilots.

FIG. 4 depicts a prior art time tracking apparatus suitable for tracking the average of two transmit diversity pilots. Signals are received at antenna 410 and delivered for conversion to baseband in RF downconvert 415, using techniques known in the art. Baseband samples are delivered to timing offset 420, where on-time, early, and late streams of samples are generated corresponding to timing offsets in the incoming signal of $\tau$, $\tau-\frac{1}{2}$, and $\tau+\frac{1}{2}$, respectively. The early sequences are sampled prior to a timing reference, and the late sequences are sampled subsequent to that timing reference. It is common to sample the early and late sequences one half chip from the timing reference, but other differences can also be used.

The on-time sequence, the timing of which is linked to the timing reference, is used for data demodulation. The incoming sequence is despread with the primary data spreading code, $C_{d1}(n)$, in despreader 432, accumulated in accumulator 434, and despread with an estimate of the primary pilot signal, $\hat{P}_1$, in despreader 436, to produce the primary received symbols. Similarly, the incoming sequence is despread with the diversity data spreading code, $C_{d2}(n)$, in despreader 438, accumulated in accumulator 440, and despread with an estimate of the primary pilot signal, $\hat{P}_2$, in despreader 442, to produce the diversity received symbols. The accumulation interval used in accumulators 434 and 440 will generally be the length of one symbol. In some embodiments, the primary and diversity data spreading sequences may be the same. The primary and secondary data sequences are delivered to data demux 444, where the primary and diversity data streams are de-multiplexed to produce the output data symbols.

The timing reference, $\tau$, is produced in tracking loop 490, which operates to track time based on the weighted average of the error energies in the primary and diversity pilots, A and B, respectively. The weighted average is produced in block 488, where $\alpha_1$ is multiplied by A and added to the result of $\alpha_2$ multiplied by B. The scaling factors, $\alpha_1$ and $\alpha_2$, may be altered to account for differences in received energy of the two pilot signals.

The result labeled A corresponds to the difference between the energy in the early signal and the energy in the late signal corresponding to the primary antenna. The energy in the early signal for the primary antenna is computed by despreading the early samples with the primary pilot sequence, $C_{p1}(n)$, in despreader 452, accumulating the despread samples in accumulator 454, and computing the squared magnitude of the accumulated samples in squarer 456. Similarly, the energy in the late signal for the primary antenna is computed by despreading the late samples with the primary pilot sequence, $C_{p1}(n)$, in despreader 458, accumulating the despread samples in accumulator 460, and computing the squared magnitude of the accumulated samples in squarer 462. The difference, A, is computed by subtracting the late energy from the early energy in summer 464.

In similar fashion, the result labeled B corresponds to the difference between the energy in the early signal and the energy in the late signal corresponding to the diversity antenna. The energy in the early signal for the diversity antenna is computed by despreading the early samples with the diversity pilot sequence, $C_{p2}(n)$, in despreader 472, accumulating the despread samples in accumulator 474, and computing the squared magnitude of the accumulated samples in squarer 476. Similarly, the energy in the late signal for the diversity antenna is computed by despreading the late samples with the diversity pilot sequence, $C_{p2}(n)$, in despreader 478, accumulating the despread samples in accumulator 480, and computing the squared magnitude of the accumulated samples in squarer 482. The difference, B, is computed by subtracting the late energy from the early energy in summer 484.

The accumulators 454, 460, 474, and 480 will, in general, accumulate the incoming samples for an interval over which the diversity and primary pilots are orthogonal, to maximize the accuracy of the energy calculations. Using the W-CDMA pilots, shown in FIG. 3, as an example, the accumulation interval can be 512 chips.

Figure 5:
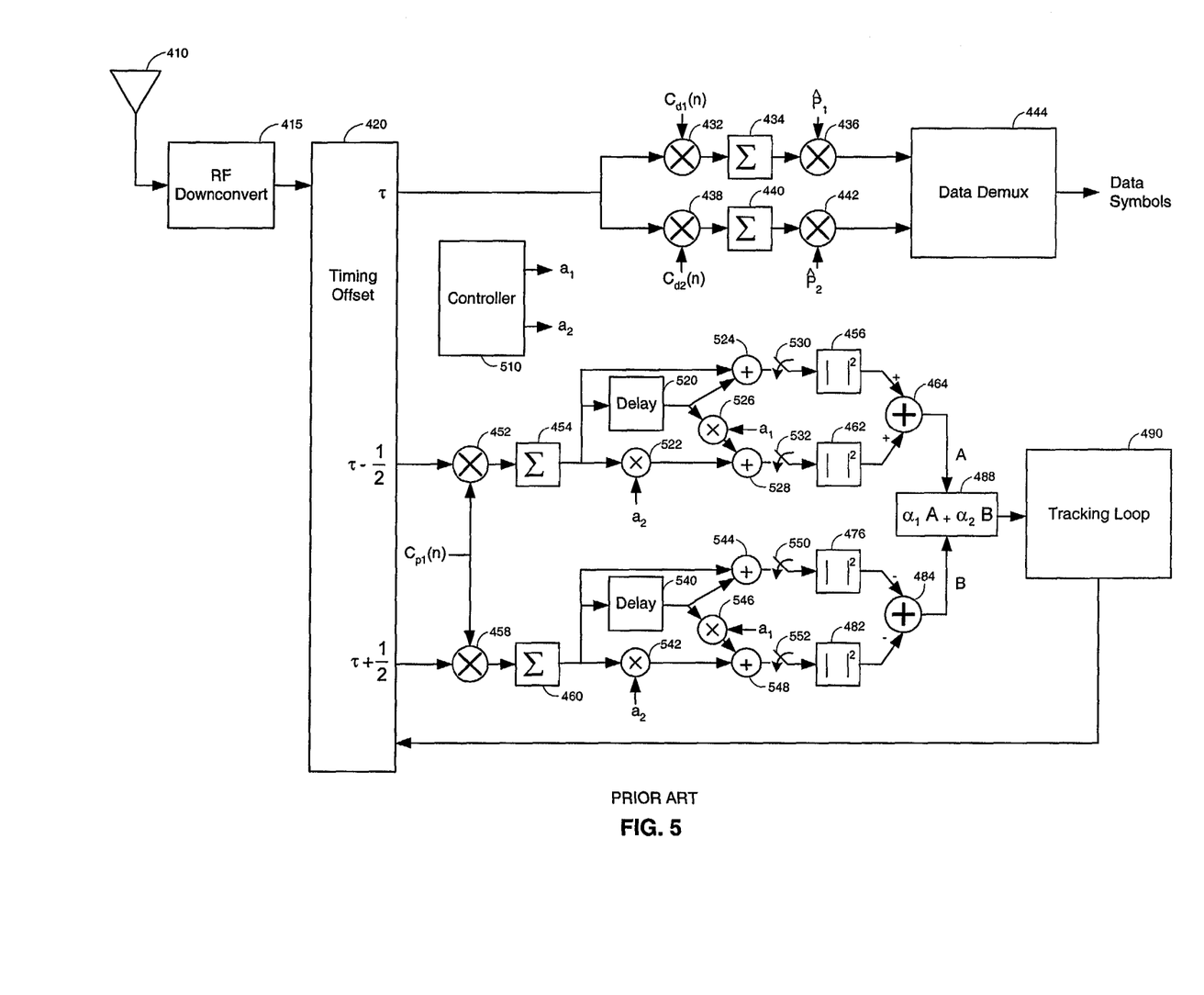
FIG. 5 depicts a prior art implementation of a transmit diversity tracking loop for tracking the average of two diversity-transmitted pilots, modified to take advantage of properties of certain sets of pilot signals, such as those defined in the W-CDMA standard.

FIG. 5 depicts an alternate prior art time tracking apparatus suitable for tracking the average of two transmit diversity pilots, modified to take advantage of the properties of the W-CDMA pilots, depicted in FIG. 3. The data demodulation path, 410–444, functions essentially the same as the like numbered elements of the apparatus of FIG. 4. Tracking loop 490 also operates on a weighted average 488 of the primary and diversity early/late energy differences, as calculated in squarers 456, 462, 476, and 482, and summers 464 and 484, respectively, as described above. However, notice that the output of squarers 456 and 462 correspond to the early energies of the primary and diversity pilots, respectively, and they are summed in summer 464 to produce a combined early energy. Likewise, the output of squarers 476 and 482 correspond to the late energies of the primary and diversity pilots, respectively, and they are negated and added in summer 484. The sum in block 488 then produces the difference between the early and late energies of both pilots combined. Note that the scaling factors, $\alpha_1$ and $\alpha_2$, need not be deployed.

This apparatus reduces the complexity required to generate the energies, either by reducing the hardware required, if discrete hardware is used, or the amount of computation required if a DSP or other processor is used to make the calculations, by using the property that the underlying sequence in both the primary and diversity pilots is the same. Therefore, a single despreader 452 is used to despread the early sequence with the primary pilot sequence, $C_{p1}(n)$, and the despread chips are accumulated in accumulator 454 for one symbol period. In like fashion, a single despreader 458 is used to despread the late sequence with the primary pilot sequence, $C_{p1}(n)$, and the despread chips are accumulated in accumulator 460 for one symbol period.

Since multiplying each symbol's worth of chips in the underlying PN sequence by +A or −A generates the diversity pilot sequence, despreading with the diversity pilot sequence, $C_{p2}(n)$, is not necessary. Instead, controller 510 manipulates variables $a_1$ and $a_2$, to control multipliers 526, 522, 546, and 542, as shown, to generate the diversity antenna values at the output of summer 528 and 548. The variables $a_1$ and $a_2$ take on values of +1 or −1 (the aforementioned multipliers can be replaced by sign manipulators, as will be clear to those of skill in the art), to account for the effect of the orthogonalizing sequence applied to the diversity pilot. A symbol's worth of chips are accumulated in each accumulator 454 and 460, respectively, and the outputs are delayed by one symbol in delay elements 520 and 540, respectively. Then, every two symbols, the outputs of summers 524, 528, 544, and 548 contain the accumulations for the early primary pilot, early diversity pilot, late primary pilot, and late diversity pilot, respectively, for two symbols. Samplers 530, 532, 550, and 552 operate to sample these pilot accumulations every other symbol, for energy computation in the respective squarers 456, 462, 476, and 482.

Note that in both the apparatuses, just discussed, shown in FIG. 4 and FIG. 5, the accumulation interval (or coherent accumulation) was 512 chips, or two symbols. As is well known in the art, it is advantageous to coherently combine as many chips as possible (defined by the coherence bandwidth), before squaring the magnitude, to maximize the received signal to noise ratio (SNR). Thus, when applied with the W-CDMA pilot signals shown in FIG. 3, the apparatus of FIG. 5 has comparable performance to the apparatus of FIG. 4, with greatly reduced complexity.

Figure 6:
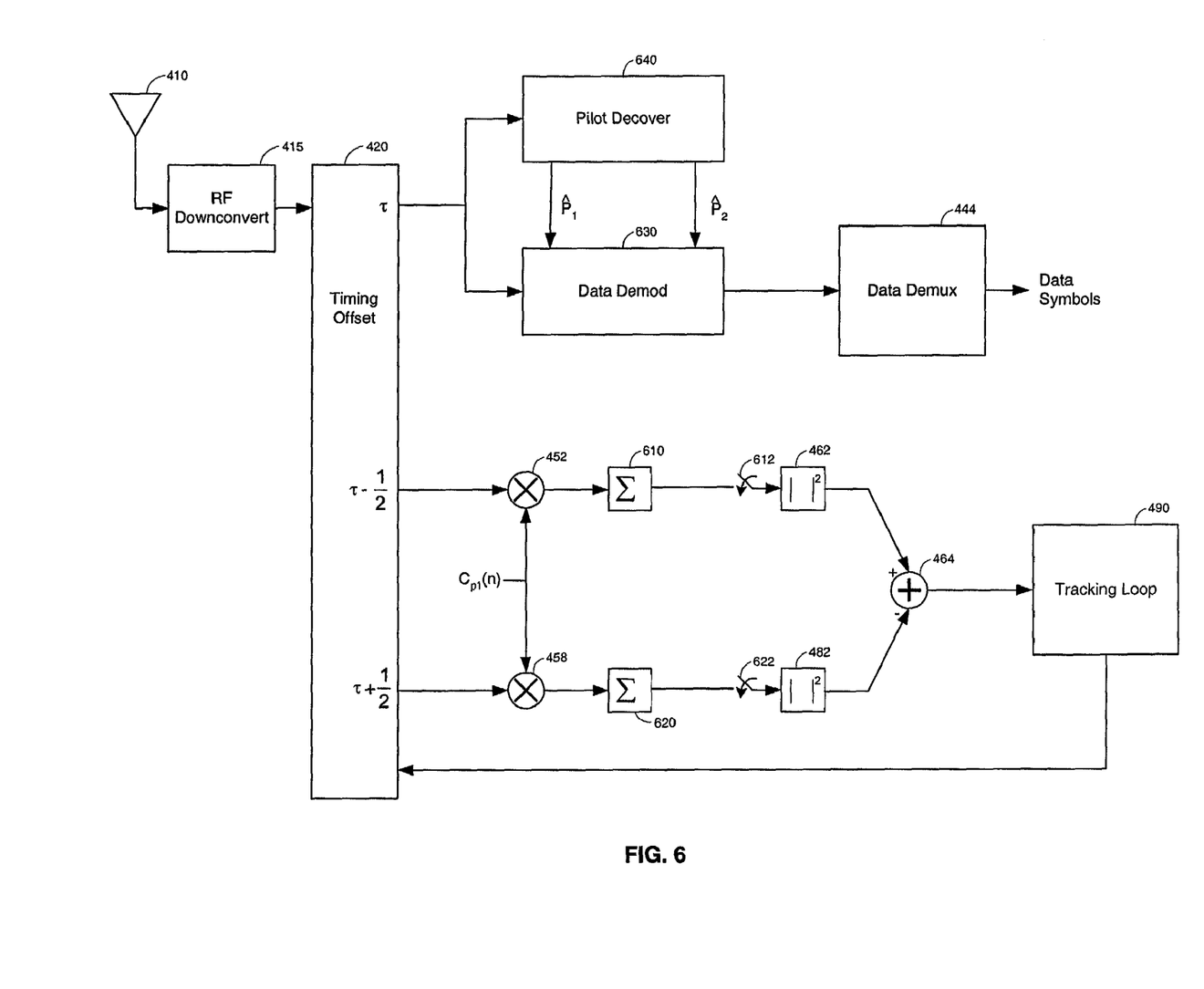
FIG. 6 depicts an improved transmit diversity tracking loop for tracking the average of two diversity-transmitted pilots.

FIG. 6 depicts an apparatus for time tracking diversity antennas which takes further advantage of pilot signal properties, such as those found in W-CDMA systems, to further reduce the amount of computation hardware or processing necessary for tracking diversity antennas. FIG. 6 depicts a subset of the components of a mobile station 106.

The components (or a subset thereof) depicted in FIG. 6 may also comprise a sub-component of a mobile station 106, such as an integrated circuit. Antenna 410, RF downconvert 415, and timing offset 420 operate substantially the same as the like-numbered elements described above. As before, timing offset 420 generates on-time, early and late sequences of input samples.

In one embodiment, the early and late sequences are accumulated for one symbol, or a 256-chip duration, in accumulators 610 and 620, respectively. Recall, from the above discussion, that the signal from each of the antennas is received with complex gain g0 or g1, respectively, corresponding to different fading experienced by the two antennas. The magnitude of the output of accumulators 610 and 620 is squared in squarers 462 and 482, respectively, on symbol boundaries. One technique for calculating energies on the symbol boundaries is to deploy samplers 612 and 622 to generate a new input every symbol. The resultant late output is subtracted from the resultant early output in summer 464, the difference from which is used to drive tracking loop 490 to produce the timing reference for timing offset 420.

Therefore, if the early and late sequences are despread with the primary pilot sequence, $C_{p1}(n)$, in despreaders 452 and 458, respectively, the resultant accumulations will be proportional to the following values: (g0+g1)A during symbol 0, (g0−g1)A during symbol 1, (g0−g1)A during symbol 2, (g0+g1)A during symbol 3, and so on. On symbols 0 and 3, etc., the output of summer 464 is proportional to $|g0+g1|^2$. On symbols 1 and 2, etc., the output of summer 464 is proportional to $|g0−g1|^2$. The tracking loop 490 filters the output of the summer over multiple symbols, essentially producing an average. Therefore, the tracking loop 490 effectively tracks based on the energy $|g0+g1|^2+|g0−g1|^2=2(|g0|^2+|g1|^2)$, which is proportional to the total energy received from both antennas.

Data demodulator 630 is used to demodulate the on-time sequence from timing offset 420, the timing of which is directed by the output of tracking loop 490. On-time samples are also used in pilot decover 640 to produce estimates of the primary and diversity pilots, $\hat{P}_1$ and $\hat{P}_2$, which are used to demodulate data in data demodulator 630. Data demodulator 630 produces data corresponding to the data received from the primary and diversity antennas. If needed, data demux 444 can be deployed to de-multiplex the two antenna data streams to produce the output data symbols.

There are a variety of techniques for decovering pilot signals known in the art. One method is to despread the on-time sequence with the pilot sequence, and accumulate the despread chips for a symbol interval to determine the pilot estimate. This is performed for the primary and the diversity pilot to recover $\hat{P}_1$ and $\hat{P}_2$.

Another method takes advantage of the relationship between the primary and diversity pilot. Each symbol is despread using the primary pilot sequence and accumulated for one symbol. A buffer stores the previous accumulated symbol as well. The current and previous symbols, despread with the primary pilot sequence, can be added or subtracted to yield an estimate of both the primary and diversity pilot symbols. Recall that during each symbol interval, the mobile station receives a combination of the signals, transmitted from the primary and diversity antenna, with complex gains g1 and g2 corresponding to the respective channels. In symbol 0, (g1+g2)A is received. In symbol 1, (g1−g2)A is received. In symbol 2, (g1−g2)A is received. In symbol 3, (g1+g2)A is received. And the pattern repeats. Adding symbol 0 to symbol 1 yields 2(g1)(A), which is proportional to g1, and can be used for estimating $\hat{P}_1$. Subtracting symbol 1 from symbol 0 yields 2(g2)(A), which is proportional to g2, and can be used for estimating $\hat{P}_2$. Symbols 2 and 3 add to produce 2(g1)(A), which is proportional to g1, and can be used for estimating $\hat{P}_1$. The difference between symbols 2 and 3 is 2(g2)(A), which is proportional to g2, and can be used for estimating $\hat{P}_2$. This process can be repeated, calculating pilot estimates every other symbol, using the estimates for data demodulation.

Figure 7:
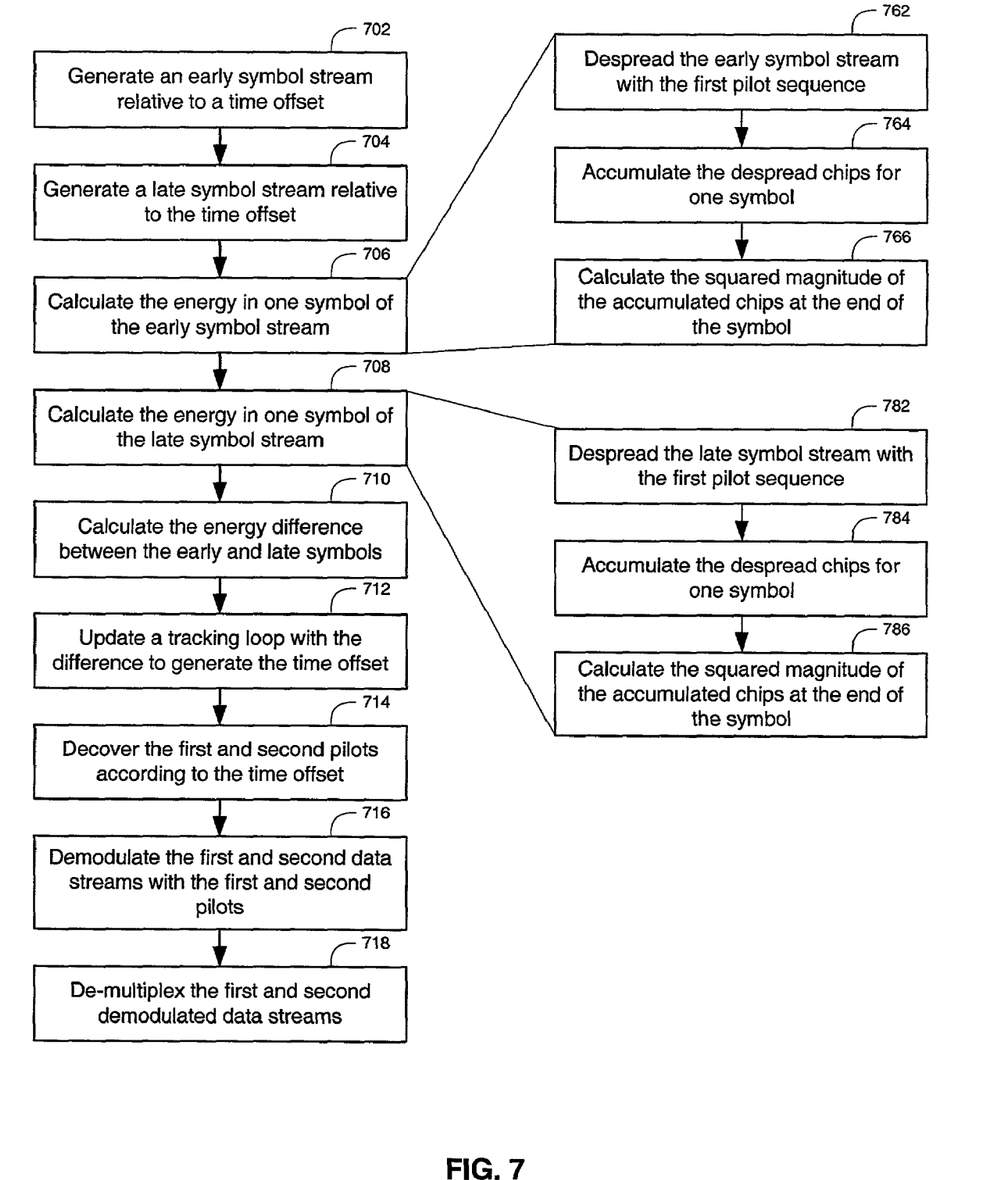
FIG. 7 depicts a flowchart of an embodiment of a method for time tracking the average of two diversity-transmitted pilots.

FIG. 7 depicts a flowchart of an embodiment of a method for time tracking the average of two diversity-transmitted pilots. Those of skill in the art will recognize that the method is applicable to any number of diversity pilots, and is not limited to two. In step 702, an early symbol stream is generated relative to a time offset. In step 704, a late symbol stream is generated relative to that time offset. In steps 706 and 708, the energy in one symbol of the early and late symbol streams are calculated, respectively. The energy difference between the early and late symbols is calculated in step 710. In step 712, a tracking loop is updated with the energy difference to generate the time offset. The first and second pilots are decovered according to the time offset in step 714. Any technique for pilot decovering will apply, examples of which were given above. First and second data streams, corresponding to those transmitted from the primary and diversity antennas, are demodulated with the first and second pilots in step 716. As necessary, the first and second demodulated data streams are de-multiplexed in step 718.

Steps 706 can be carried out using steps 762–766. In step 762, the early symbol stream is despread with the first pilot sequence, for example, the primary pilot sequence. The despread chips are accumulated for one symbol in step 764. In the exemplary embodiment, the number of chips in a symbol is 256. In step 766, the squared magnitude of the accumulated chips is calculated at the symbol boundary. In like fashion, step 708 can be carried out using steps 782–786. In step 782, the late symbol stream is despread with the first pilot sequence. The despread chips are accumulated for one symbol in step 784, and the squared magnitude is calculated at the symbol boundary in step 786.

Note that the method embodiment of FIG. 7, and the apparatus embodiment of FIG. 6 are both simplified with respect to those shown in FIGS. 4 and 5. For the sake of discussion, the orthogonalizing sequence given in the W-CDMA standard was used, but those of skill in the art will recognize that the principles apply to any orthogonalizing sequence.

The apparatus shown in FIG. 6, as well as the method shown in FIG. 7, can be embodied or carried out using a DSP or other general purpose processor, coupled to or containing a memory for carrying out the steps described (details not shown). Alternatively, special purpose hardware can be deployed to carry out some or all of the steps and processes described, or a combination of general purpose and special purpose hardware can be deployed.

While the embodiments depicted in FIGS. 6 and 7 are greatly simplified with respect to the prior art, it should be noted that the effective coherent accumulation interval for tracking both pilots is one symbol, which is 256 chips in the exemplary embodiment. This is contrasted with the 512-chip coherent accumulation interval possible with the apparatuses of FIGS. 4 and 5. As discussed above, in general, it is desirable to coherently combine as many chips as possible, since the signal portion is correlated and thus combines coherently, but the noise, generally assumed to be independent, does not coherently combine. The result is an improved signal to noise ratio, and a tracking loop driven by an improved estimate will tend to exhibit improved tracking. In some circumstances, the performance of the tracking loop may reflect the 256-chip accumulation when compared with a 512-chip accumulation.

An alternate embodiment can be deployed to provide the same performance as the apparatuses shown in FIGS. 4 and 5, using the simplified embodiment of FIG. 6 with slight modification. Note that the orthogonalizing sequence, depicted in FIG. 3, comprises runs of positive and negative values of A. In this example, once the initial symbol has been generated, there are always two negative values followed by two positive values, or, in other words, runs of length two. In the alternate embodiment, the accumulators 610 and 620 accumulate chips for the number of symbols in a run. In this example, the number of chips is 512, or two symbols. Samplers 612 and 622 correspondingly deliver the results for squaring every 512 chips, or two symbols. In general, the samplers 612 and 622 will sample at the end of the accumulation period used by accumulators 610 and 620. (Those of skill will recognize that the samplers, 612 and 622, can be moved subsequent to the squaring operations, or replaced with a sampler subsequent to summer 464, which may also be a part of tracking loop 490). Whereas the one-symbol embodiment, described above, needs only to keep track of the symbol boundary, this alternate embodiment must also keep track of which symbol is currently being accumulated, or at least the boundaries of each run. This is because the accumulation must be aligned with the run for the diversity pilot to be combined. Using the example of FIG. 3, if the accumulation occurred over symbols 0 and 1, the diversity antenna component would cancel out. Accumulating over symbols 1 and 2 provides the maximum magnitude, $4A^2(g0-g1)^2$. Then, accumulating over symbols 3 and 4 produces $4A^2(g0+g1)^2$, and so on. The tracking loop 490 will track on the average.

Figure 8:
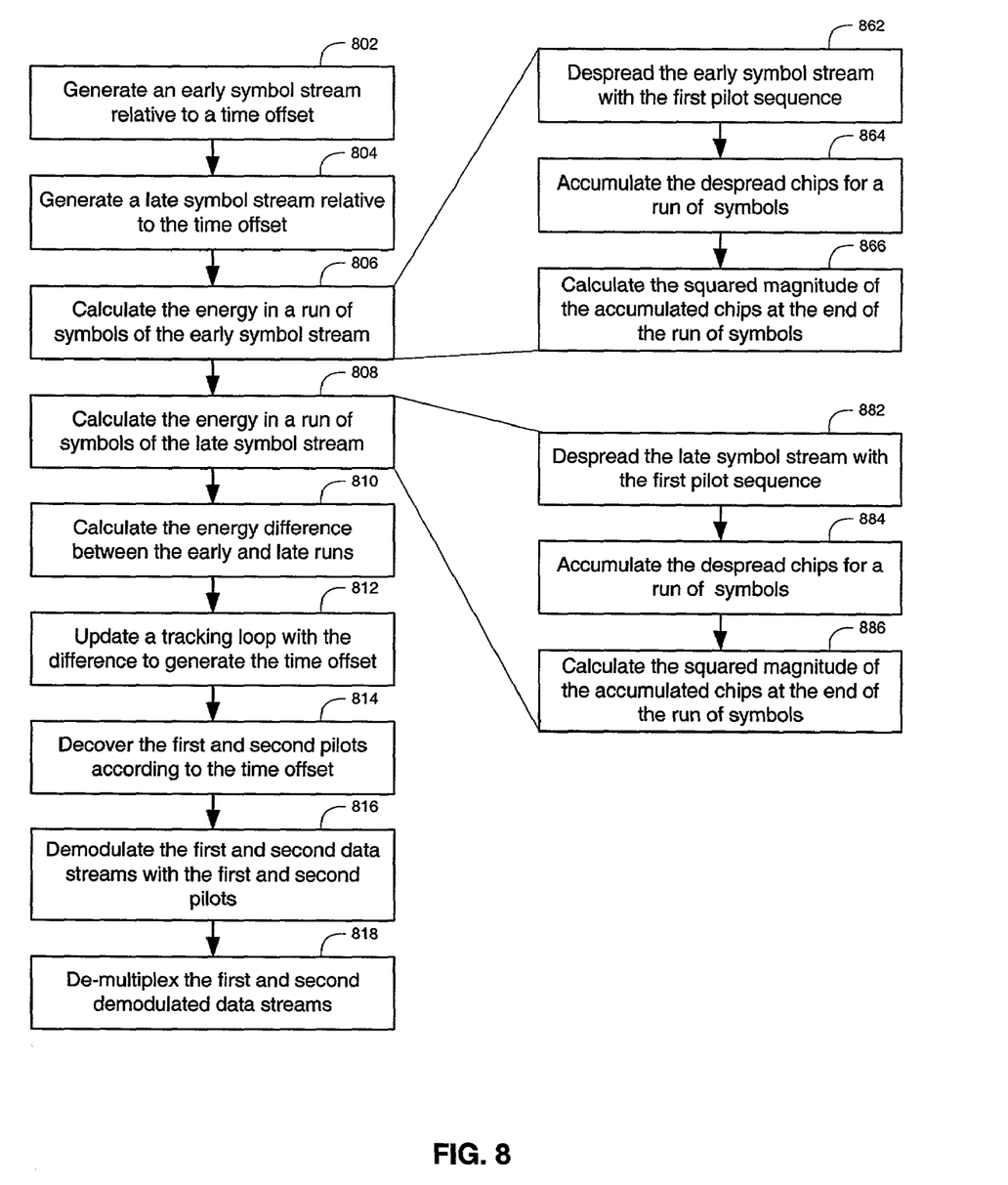
FIG. 8 depicts a flowchart of an alternate embodiment of a method for time tracking the average of two diversity-transmitted pilots.

FIG. 8 depicts a flowchart of an alternate embodiment of a method for time tracking the average of two diversity-transmitted pilots. It is similar to the embodiment depicted in FIG. 7, with the few modifications just described. Those of skill in the art will recognize that the method is applicable to any number of diversity pilots, and is not limited to two. In step 802, an early symbol stream is generated relative to a time offset. In step 804, a late symbol stream is generated relative to that time offset. In steps 806 and 808, the energy in a run of symbols of the early and late symbol streams are calculated, respectively. The energy difference between the early and late symbol runs is calculated in step 810. In step 812, a tracking loop is updated with the energy difference to generate the time offset. The first and second pilots are decovered according to the time offset in step 814. Any technique for pilot decovering will apply, examples of which were given above. First and second data streams, corresponding to those transmitted from the primary and diversity antennas, are demodulated with the first and second pilots in step 816. As necessary, the first and second demodulated data streams are de-multiplexed in step 818.

Steps 806 can be carried out using steps 862–866. In step 862, the early symbol stream is despread with the first pilot sequence, for example, the primary pilot sequence. The despread chips are accumulated for the number of symbols in a run in step 864. In the exemplary embodiment, the number of chips in a symbol is 256, and the run is two symbols, for a total of 512 chips. In step 866, the squared magnitude of the accumulated chips is calculated at the run boundary. In like fashion, step 808 can be carried out using steps 882-886. In step 882, the late symbol stream is despread with the first pilot sequence. The despread chips are accumulated for the number of symbols in a run in step 884, and the squared magnitude is calculated at the run boundary in step 886.

The embodiments of FIG. 8 and FIG. 6 (modified for accumulating runs) maintain essentially the same complexity as the embodiments of FIG. 7 and FIG. 6 (without the modification), with the exception that run boundaries are tracked, while providing the performance of those shown in FIGS. 4 and 5. Any orthogonalizing signal comprised of runs of positive and negative values can be used. Various configurations of general and special purpose hardware, as described above, can also be deployed.

Note that the foregoing discussion has used the signals, codes and parameters defined in the W-CDMA standard as some of the exemplary signals, codes and parameters. This is for clarity of discussion only, and should not be construed to limit the scope of the present invention to W-CDMA systems. The principles of the present invention apply to any conceivable system that employs an orthogonalizing sequence to generate primary and diversity pilots with the properties described. Various combinations of pilot and data encoding schemes for diversity transmission with antenna verification are anticipated and fall within the scope of the present invention. Those skilled in the art will recognize how to adapt the various embodiments described for use with such alternate systems.

It should be noted that in all the embodiments described above, method steps can be interchanged without departing from the scope of the invention.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A time tracking apparatus, operable with a base station configured for transmit diversity, transmitting a first pilot sequence on a first antenna and a second pilot sequence on a second antenna, the second pilot sequence generated by multiplying each symbol of the first pilot sequence by a value from an orthogonalizing sequence, the symbols consisting of a first pre-determined number of chips, comprising:
   a first timing offset for receiving input samples and for generating an early sequence of samples corresponding to a first pre-determined offset before a timing reference;
   a second timing offset for receiving input samples and for generating a late sequence of samples corresponding to a second pre-determined offset after a timing reference;
   a first despreader for despreading the early sequence of samples with the first pilot sequence;
   a second despreader for despreading the late sequence of samples with the first pilot sequence;
   a first accumulator for accumulating despread samples from the first despreader for a second pre-determined number of chips to produce a first accumulation;
   a second accumulator for accumulating despread samples from the second despreader for the second pre-determined number of chips to produce a second accumulation;
   a first magnitude squarer for generating a first squared magnitude from the first accumulation;
   a second magnitude squarer for generating a second squared magnitude from the second accumulation;
   a subtractor for generating the difference between the first and second squared magnitudes;
   a tracking loop for receiving the difference from the subtractor and for generating the timing reference in response to the difference; and
   a pilot decover for estimating the first and second pilots from the input samples in accordance with the timing reference.

2. A time tracking apparatus, operable with a base station configured for transmit diversity, transmitting a first pilot sequence on a first antenna and a second pilot sequence on a second antenna, the second pilot sequence generated by multiplying each symbol of the first pilot sequence by a value from an orthogonalizing sequence, the symbols consisting of a first pre-determined number of chips, comprising:
   a first timing offset for receiving input samples and for generating an early sequence of samples corresponding to a first pre-determined offset before a timing reference;
   a second timing offset for receiving input samples and for generating a late sequence of samples corresponding to a second pre-determined offset after a timing reference;
   a first despreader fox despreading the early sequence of samples with the first pilot sequence;
   a second despreader for despreading the late sequence of samples with the first pilot sequence;
   a first accumulator for accumulating despread samples from the first despreader for a second pre-determined number of chips to produce a first accumulation;
   a second accumulator for accumulating despread samples from the second despreader for the second pre-determined number of chips to produce a second accumulation;
   a first magnitude squarer for generating a first squared magnitude from the first accumulation;
   a second magnitude squarer for generating a second squared magnitude from the second accumulation;
   a subtractor for generating the difference between the first and second squared magnitudes;
   a tracking loop for generating the timing reference in response to the difference; and
   a pilot decover for estimating the first and second pilots from the input samples in accordance with the timing reference,
   wherein the second pre-determined number of chips equals the first pre-determined number of chips.

3. The apparatus of claim 2, wherein the first pre-determined number of chips is 256.

4. A time tracking apparatus, operable with a base station configured for transmit diversity, transmitting a first pilot sequence on a first antenna and a second pilot sequence on a second antenna, the second pilot sequence generated by multiplying each symbol of the first pilot by a value from an orthogonalizing sequence, the symbols consisting of a first pre-determined number of chips, comprising:
   a first timing offset for receiving input samples and for generating an early sequence of samples corresponding to a first pre-determined offset before a timing reference;
   a second timing offset for receiving input samples and for generating a late sequence of samples corresponding to a second pre-determined offset after a timing reference;
   a first despreader for despreading the early sequence of samples with the first pilot sequence;
   a second despreader for despreading the late sequence of samples with the first pilot sequence;
   a first accumulator for accumulating despread samples from the first despreader for a second pre-determined number of chips to produce a first accumulation;
   a second accumulator for accumulating despread samples from the second despreader for the second pre-determined number of chips to produce a second accumulation;

a first magnitude squarer for generating a first squared magnitude from the first accumulation;

a second magnitude squarer for generating a second squared magnitude from the second accumulation;

a subtracter for generating the difference between the first and second squared magnitudes;

a tracking loop for generating the timing reference in response to the difference; and a pilot decover for estimating the first and second pilots from the input samples in accordance with the timing reference, wherein the first and second timing offsets are one timing offset.

5. The apparatus of claim 1, wherein the pre-determined offset is one half chip.

6. A time tracking apparatus, operable with a base station configured for transmit diversity, transmitting a first pilot sequence on a first antenna and a second pilot sequence on a second antenna, the second pilot sequence generated by multiplying each symbol of the first pilot sequence by a value from an orthogonalizing sequence, the symbols consisting of a first pre-determined number of chips, comprising:

a first timing offset for receiving input samples and for generating an early sequence of samples corresponding to a first pre-determined offset before a timing reference;

a second timing offset for receiving input samples and for generating a late sequence of samples corresponding to a second pre-determined offset after a timing reference;

a first despreader for despreading the early sequence of samples with the first pilot sequence;

a second despreader for despreading the late sequence of samples with the first pilot sequence;

a first accumulator for accumulating despread samples from the first despreader for a second pre-determined number of chips to produce a first accumulation;

a second accumulator for accumulating despread samples from the second despreader for the second pre-determined number of chips to produce a second accumulation;

a first magnitude squarer for generating a first a squared magnitude from the first accumulation;

a second magnitude squarer for generating a second squared magnitude from the second accumulation;

a subtractor for generating the difference between the first and second squared magnitudes;

a tracking loop for generating the timing reference in response to the difference; and a pilot decover for estimating the first and second pilots from the input samples in accordance with the timing reference, wherein:

the orthogonalizing sequence comprises alternating runs of positive values with runs of negative values, the runs being a pre-determined number of values;

the second pre-determined number of chips equals the first pre-determined number of chips multiplied by the pre-determined number of values in a run; and the first and second accumulators align the accumulation with the runs.

7. The apparatus of claim 6, wherein the first pre-determined number of chips is 256.

8. The apparatus of claim 6, wherein the pre-determined number of values is 2.

9. The apparatus of claim 1, further comprising a data demodulator for demodulating a first and second data stream with the first and second estimated pilots.

10. The apparatus of claim 9, further comprising a data de-multiplexor for de-multiplexing the demodulated first and second data streams to produce output symbols.

11. A method of time tracking a plurality of pilot sequences, a first pilot sequence transmitted from a first antenna, each of the remaining plurality of pilot sequences transmitted on a corresponding plurality of antennas, each remaining pilot sequence generated by multiplying each symbol of the first pilot sequence by a value from an orthogonalizing sequence of a plurality of orthogonalizing sequences, the symbols consisting of a first pre-determined number of chips, comprising:

calculating a difference between the energy in a correlation of the first pilot sequence with an early received sequence of input samples and the energy in a correlation of the first pilot sequence with a late received sequence of input samples, the correlations for a pre-determined length, the early and late sequences referenced to a timing reference;

updating a tracking loop with the difference to produce the timing reference; and estimating the plurality of pilot sequences in accordance with the timing reference wherein:

the orthogonalizing sequence comprises alternating runs of positive values with runs of negative values, the runs being a pre-determined number of values;

the pre-determined length equals the pre-determined number of chips multiplied by the pre-determined number of values in a run; and the correlation is aligned with the runs.

12. A method of time tracking a plurality of pilot sequences, a first pilot sequence transmitted from a first antenna, each of the remaining plurality of pilot sequences transmitted on a corresponding plurality of antennas, each remaining pilot sequence generated by multiplying each symbol of the first pilot sequence by a value from an orthogonalizing sequence of a plurality of orthogonalizing sequences, the symbols consisting of a first pre-determined number of chips, comprising:

calculating a difference between the energy in a correlation of the first pilot sequence with an early received sequence of input samples and the energy in a correlation of the first pilot sequence with a late received sequence of input samples, the correlations for a pre-determined length, the early and late sequences referenced to a timing reference;

updating a tracking loop with the difference to produce the timing reference; and estimating the plurality of pilot sequences in accordance with the timing reference wherein:

the orthogonalizing sequence comprises alternating runs of positive values with runs of negative values, the runs being a pre-determined number of values;

the pre-determined length equals the pre-determined number of chips multiplied by the pre-determined number of values in a run; and the correlation is aligned with the runs.

13. A method of time tracking a plurality of pilot sequences, a first pilot sequence transmitted from a first antenna, each of the remaining plurality of pilot sequences transmitted on a corresponding plurality of antennas, each remaining pilot sequence generated by multiplying each symbol of the first pilot sequence by a value from an orthogonalizing sequence of a plurality of orthogonalizing sequences, the symbols consisting of a first pre-determined number of chips, comprising:

calculating a difference between the energy in a correlation of the first pilot sequence with an early received sequence of input samples and the energy in a correlation of the first pilot sequence with a late received sequence of input samples, the correlations for a pre-determined length, the early and late sequences referenced to a timing reference;

updating a tracking loop with the difference to produce the timing reference; and estimating the plurality of pilot sequences in accordance with the timing reference wherein:

the orthogonalizing sequences comprise alternating runs of positive values with runs of negative values, the runs being a pre-determined number of values;

the pre-determined length equals the pre-determined number of chips multiplied by the pre-determined number of values in a run; and the correlation is aligned with the runs.

14. A mobile station, operable with a base station configured for transmit diversity, transmitting a first pilot sequence on a first antenna and a second pilot sequence on a second antenna, the second pilot sequence generated by multiplying each symbol of the first pilot sequence by a value from an orthogonalizing sequence, the symbols consisting of a first pre-determined number of chips, comprising:

a first timing offset for receiving input samples and for generating an early sequence of samples corresponding to a first pre-determined offset before a timing reference;

a second timing offset for receiving input samples and for generating a late sequence of samples corresponding to a second pre-determined offset after a timing reference;

a first despreader for despreading the early sequence of samples with the first pilot sequence;

a second despreader for despreading the late sequence of samples with the first pilot sequence;

a first accumulator for accumulating despread samples from the first despreader for a second pre-determined number of chips to produce a first accumulation;

a second accumulator for accumulating despread samples from the second despreader for the second pre-determined number of chips to produce a second accumulation;

a first magnitude squarer for generating a first squared magnitude from the first accumulation;

a second magnitude squarer for generating a second squared magnitude from the second accumulation;

a subtractor for generating the difference between the first and second squared magnitudes;

a tracking loop for receiving the difference from the subtraction and for generating the timing reference in response to the difference; and a pilot decover for estimating the first and second pilots from the input samples in accordance with the timing reference.

15. An apparatus, operable with a remote station configured for transmit diversity, transmitting a first pilot sequence on a first antenna and a second pilot sequence on a second antenna, the second pilot sequence generated by multiplying each symbol of the first pilot sequence by a value from an orthogonalizing sequence, the symbols consisting of a first pre-determined number of chips, comprising:

a timing offset with a timing reference input and a sample output;

a first despreader with a first despreader input, a second despreader input, and an output;

a second despreader with a first despreader input, a second despreader input, and an output;

a first accumulator with an accumulator input and an output, the accumulator input coupled to the first despreader output;

a second accumulator with an accumulator input and an output, the accumulator input coupled to the second despreader output;

a first magnitude squarer with an input and an output, the first magnitude squarer input coupled to the first accumulator output;

a second magnitude squarer with an input and an output, the second magnitude input coupled to the second accumulator output;

a subtractor wit a first input second input, and an output, the first subtractor input coupled to the first magnitude squarer output, the second subtractor input coupled to the second magnitude squarer output;

a tracking loop with an input and an output, the tracking loop input coupled to the subtractor output, the tracking loop output coupled to the timing offset timing reference input; and a pilot decover with a first pilot input, a second pilot input, and a sample input, the pilot decover first pilot input coupled to the first pilot, the pilot decover second pilot input coupled to the second pilot, the sample input coupled to the timing offset sample output.

* * * * *